(12) United States Patent
Kuhlman

(10) Patent No.: US 9,033,426 B2
(45) Date of Patent: May 19, 2015

(54) BRAKING SYSTEM WITH SWITCHABLE PUMP PATH

(71) Applicant: Robert Bosch GmbH, Stuttgart (DE)

(72) Inventor: Ryan A. Kuhlman, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 205 days.

(21) Appl. No.: 13/720,534

(22) Filed: Dec. 19, 2012

(65) Prior Publication Data

US 2014/0167493 A1   Jun. 19, 2014

(51) Int. Cl.
| | | |
|---|---|---|
| B60T 8/34 | (2006.01) | |
| B60T 13/14 | (2006.01) | |
| B60T 13/58 | (2006.01) | |
| B60T 8/40 | (2006.01) | |
| B60T 8/48 | (2006.01) | |
| B60T 13/74 | (2006.01) | |

(52) U.S. Cl.
CPC .............. *B60T 13/142* (2013.01); *B60T 13/586* (2013.01); *B60T 8/348* (2013.01); *B60T 8/4072* (2013.01); *B60T 8/4872* (2013.01); *B60T 13/745* (2013.01)

(58) Field of Classification Search
CPC ..... B60T 8/348; B60T 8/4275; B60T 8/4872; B60T 8/94; B60T 8/4072
USPC .................. 303/5, 113.1–113.5, 114.1, 115.1, 303/115.2, 116.1, 116.2, 152
See application file for complete search history.

(56) References Cited

U.S. PATENT DOCUMENTS

| | | |
|---|---|---|
| 4,270,806 A | 6/1981 | Venkataperumal et al. |
| 4,676,558 A | 6/1987 | Klein |
| 4,826,257 A | 5/1989 | Burckhardt et al. |
| 4,852,952 A | 8/1989 | Kervagoret |
| 5,123,716 A | 6/1992 | Willmann |
| 5,496,099 A | 3/1996 | Resch |
| 5,586,814 A | 12/1996 | Steiner |
| 5,769,509 A | 6/1998 | Feigel |
| 6,074,018 A | 6/2000 | Zeiner |
| 6,116,702 A | 9/2000 | Maehara |

(Continued)

FOREIGN PATENT DOCUMENTS

| | | |
|---|---|---|
| DE | 10025038 | 11/2001 |
| DE | 102004043118 | 3/2006 |

(Continued)

OTHER PUBLICATIONS

International Search Report and Written Opinion for Application No. PCT/US2013/075321 dated Mar. 19, 2014 (20 pages).

*Primary Examiner* — Melanie Torres Williams
(74) *Attorney, Agent, or Firm* — Michael Best & Friedrich LLP

(57) ABSTRACT

A vehicle braking system includes a master cylinder having first and second outputs. First and second hydraulic braking circuits are provided between the respective master cylinder outputs and respective hydraulic wheel cylinders. A first pump provided in the first hydraulic braking circuit is operable to generate pressure and move hydraulic fluid within the first hydraulic braking circuit. A second pump provided in the second hydraulic braking circuit is operable to generate pressure and move hydraulic fluid within the second hydraulic braking circuit. A valving arrangement establishes fluid communication between the first pump and the second hydraulic braking circuit in a first configuration and prevents fluid communication between the first pump and the second hydraulic braking circuit in a second configuration.

19 Claims, 4 Drawing Sheets

(56) References Cited

U.S. PATENT DOCUMENTS

| | | |
|---|---|---|
| 6,231,134 B1 | 5/2001 | Fukasawa et al. |
| 6,412,881 B1 | 7/2002 | Isono |
| 6,719,379 B2 | 4/2004 | Crombrez |
| 6,896,338 B2 | 5/2005 | Nakayasu et al. |
| 7,309,112 B2 | 12/2007 | Isono |
| 7,416,263 B2 | 8/2008 | Schmitt |
| 2004/0207253 A1* | 10/2004 | Nakayasu et al. ......... 303/113.5 |
| 2005/0110338 A1* | 5/2005 | Tsunehara ............... 303/10 |
| 2006/0071543 A1 | 4/2006 | Nakayasu |

FOREIGN PATENT DOCUMENTS

| | | |
|---|---|---|
| EP | 1468888 | 10/2004 |
| WO | 9311009 | 6/1993 |
| WO | 9425322 | 11/1994 |
| WO | 2012156125 | 11/2012 |

\* cited by examiner

US 9,033,426 B2

BRAKING SYSTEM WITH SWITCHABLE PUMP PATH

BACKGROUND

The present invention relates to vehicles and vehicle braking systems. More particularly, the invention relates to the hydraulic connection for one or more pumps in a hydraulic braking circuit, which operates in conjunction with regenerative braking

SUMMARY

In one aspect, the invention provides a vehicle braking system including a master cylinder having first and second outputs. A first hydraulic braking circuit is provided between the first master cylinder output and a first hydraulic wheel cylinder. A second hydraulic braking circuit is provided between the second master cylinder output and a second hydraulic wheel cylinder. A first pump provided in the first hydraulic braking circuit is operable to generate pressure and move hydraulic fluid within the first hydraulic braking circuit. A second pump provided in the second hydraulic braking circuit is operable to generate pressure and move hydraulic fluid within the second hydraulic braking circuit. A valving arrangement establishes fluid communication between the first pump and the second hydraulic braking circuit in a first configuration and prevents fluid communication between the first pump and the second hydraulic braking circuit in a second configuration.

In another aspect, the invention provides a vehicle braking system including a brake pedal operable by a vehicle driver. A first hydraulic braking circuit includes a hydraulic wheel cylinder configured to brake a driven wheel in response to actuation of the brake pedal. A second hydraulic braking circuit includes a hydraulic wheel cylinder configured to brake a non-driven wheel in response to actuation of the brake pedal. A hybrid drive element coupled to the driven wheel is configured to selectively drive the driven wheel and to selectively act as a regenerative brake on the driven wheel in response to actuation of the brake pedal. A first pump provided in the first hydraulic braking circuit is operable to generate pressure and move hydraulic fluid within the first hydraulic braking circuit. A second pump provided in the second hydraulic braking circuit is operable to generate pressure and move hydraulic fluid within the second hydraulic braking circuit. Both the first and second pumps are operable to pressurize hydraulic brake fluid within the second hydraulic braking circuit to increase an amount of hydraulic braking provided by at least one of the hydraulic wheel cylinders in conjunction with a reduction in regenerative braking.

In yet another aspect, the invention provides a method of operating a vehicle braking system. The method includes selectively switching a first pump from a first configuration providing only fluid communication with a first hydraulic braking circuit to a second configuration providing only fluid communication with a second hydraulic braking circuit. With the first pump in the second configuration, the first pump is operated along with a second pump of the second hydraulic braking circuit to pressurize hydraulic fluid within the second hydraulic braking circuit.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
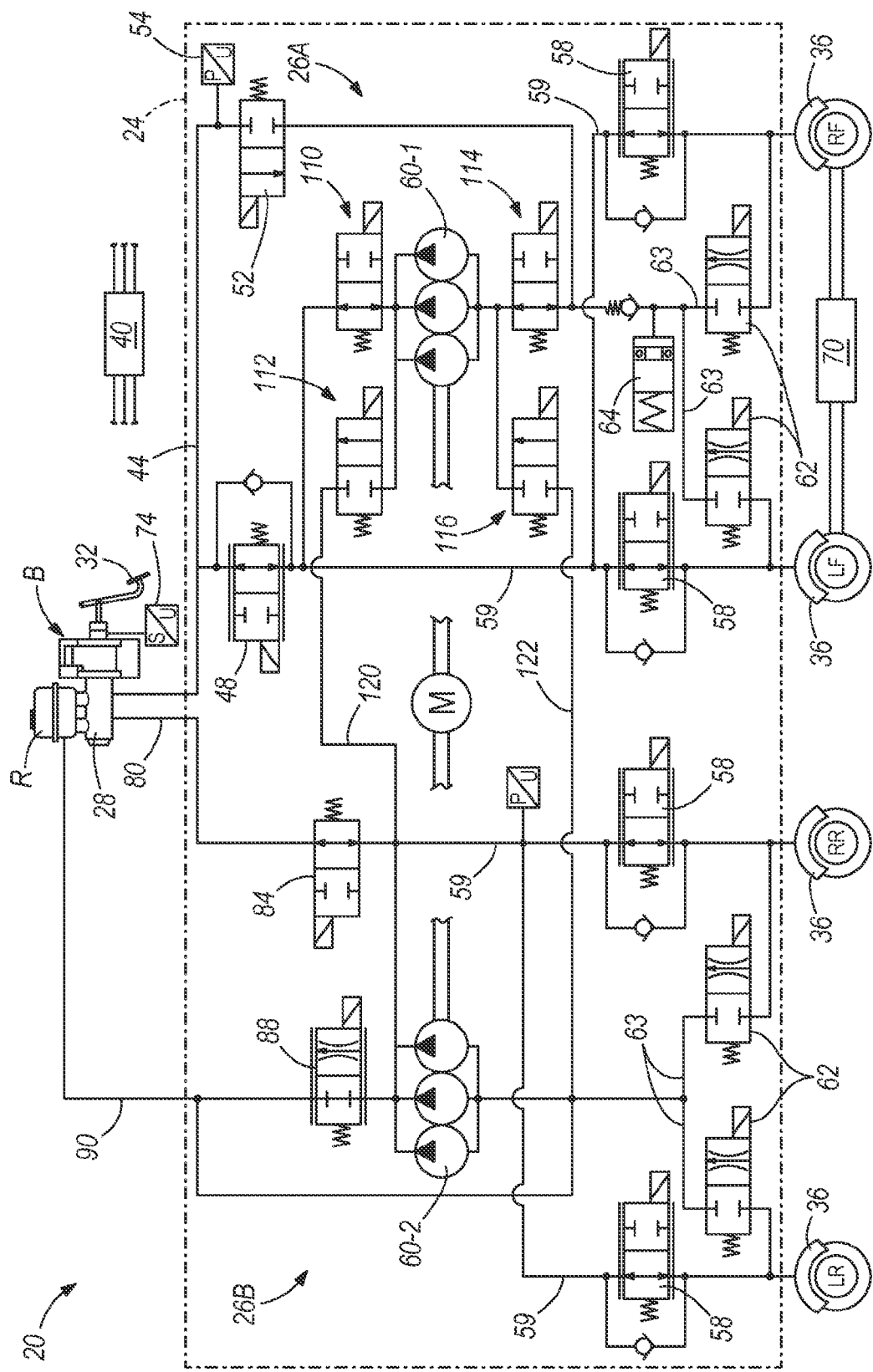
FIG. 1 is a schematic view of a hydraulic braking system according to one aspect of the invention.

A braking system 20 for a hybrid vehicle with regenerative braking function is shown in FIG. 1. The braking system 20 is provided in a wheeled vehicle and is capable of anti-lock braking functionality for preventing wheel lockup and skidding under hard braking events or braking on low friction surfaces. The braking system 20 includes a plurality of independent hydraulic braking circuits 26A, 26B between a brake master cylinder 28 (actuated by a user-operable brake pedal 32) and a plurality of wheel cylinders 36. The braking circuits 26A, 26B are physically provided in a hydraulic unit 24. In the illustrated construction, the braking circuits 26A, 26B provide a front/rear split and include a first or primary circuit 26A coupled to the front wheels LF, RF and a second or secondary circuit 26B coupled to the rear wheels LR, RR. Although the wheel cylinders 36 are shown in FIG. 1 as being incorporated with calipers of a disc braking system, other types of hydraulic braking systems may be provided at each of the wheels. The hydraulic braking circuits control the selective relief of hydraulic fluid pressure from the wheel cylinders 36 so that a braking force below the traction limit is maintained. A plurality of sensors (not shown) are coupled to a controller 40 of the braking system 20 to provide input information, typically regarding relative wheel speeds, so that the controller 40 can control the operation of the hydraulic unit 24. The hydraulic unit 24 may also be configured to provide brake force distribution and/or traction control as part of an overall electronic stability program (ESP) of the vehicle since many of the same hardware components are already provided by the braking system 20. Although the hydraulic unit 24 can be used in automotive braking systems with anti-lock and other functionality, its application is not limited to such systems.

Figure 4:
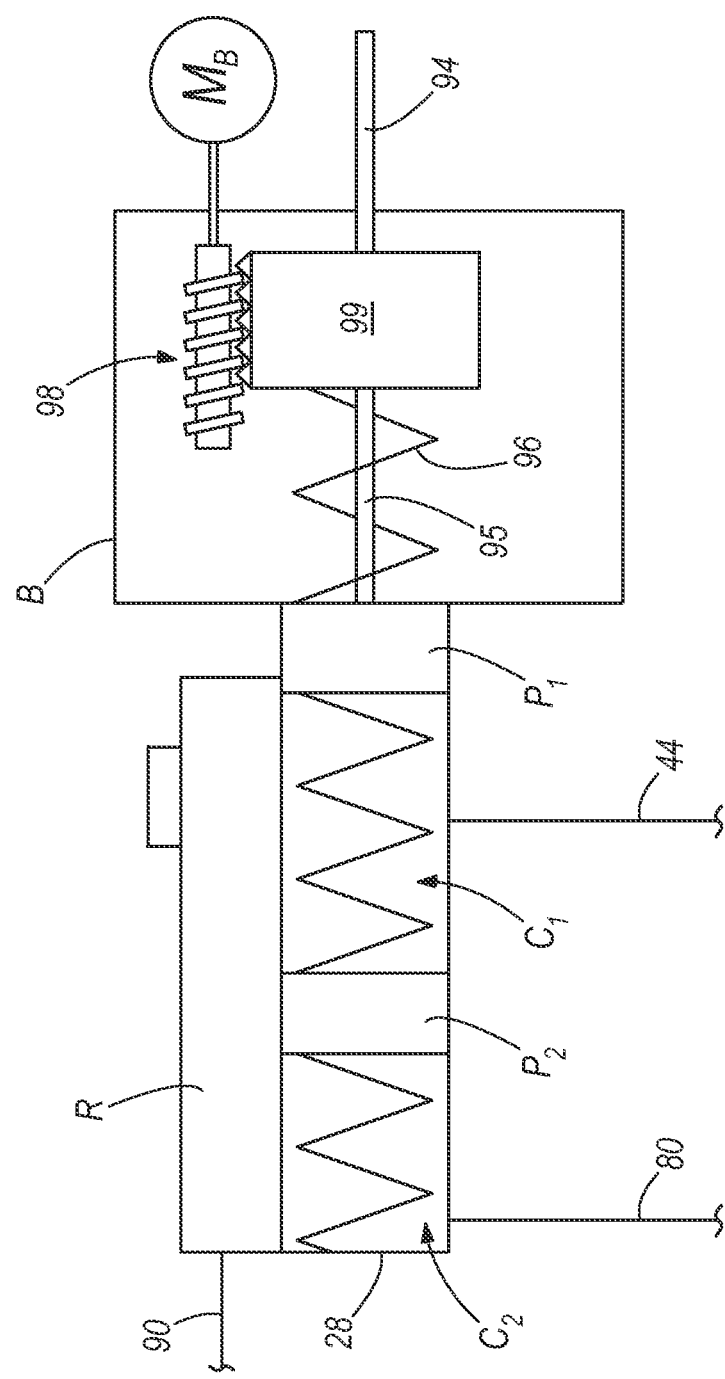
FIG. 4 is a schematic view of a master cylinder and booster device used in the hydraulic braking systems of FIGS. 1-3.

As shown in FIG. 1, the primary hydraulic braking circuit 26A includes an inlet line 44 (an output line from a primary outlet of the master cylinder 28) in fluid communication with an outlet of a primary chamber $C_1$ of the master cylinder 28 (FIG. 4). The inlet line 44 is in communication with a pilot valve 48 (e.g., a normally-open, electromagnetically controlled 2-position valve), a high pressure switching valve 52 (e.g., a normally-closed electromagnetically controlled 2-position valve), and a pressure sensor 54. The outlet of the pilot valve 48 is coupled to both of the front wheel cylinders 36 through respective inlet valves 58 (e.g., normally-open electromagnetically controlled 2-position valves) on parallel pressure lines 59. Each of the front wheel cylinders 36 is also coupled to a suction side of a pump 60-1 via a respective outlet valve 62 (e.g., a normally-closed electromagnetically controlled multi-position valve) on parallel relief lines 63. The pump 60-1 can include one or a plurality of pump elements (e.g., three elements). The outlet valves 62 can be controlled between a variety of open positions by the controller 40 to bleed off pressure from the wheel cylinders 36 that is deemed excessive or likely to exceed the traction limit. An accumulator 64 (e.g., a low-pressure accumulator) is coupled in parallel between the outlet valves 62 and the pump 60-1 and configured to receive and temporarily store fluid from the outlet valve(s) 62 prior to being removed and returned by the pump 60-1. The pump 60-1 is driven by a motor M. Additional aspects of the primary hydraulic braking circuit 26A are discussed further below.

A hybrid drive element 70 is operatively coupled to the front wheels LF, RF. The hybrid drive element 70 can be an electric motor/generator or a hydraulic pump/motor, for example. The hybrid drive element 70 is configured to provide drive power to one or both of the wheels LF, RF in a first configuration and to provide regenerative braking to the wheel(s) LF, RF in a second configuration. During regenerative braking by the hybrid drive element 70, the pilot valve 48 is actuated to the closed position so that hydraulic pressure from the outlet of the master cylinder 28 is not transferred to the wheel cylinders 36 for friction braking. Rather, the driver's input to the brake pedal 32 is sensed by a pedal stroke sensor 74, and the application of a corresponding amount of regenerative braking is controlled by the controller 40. When the rate or amount of the driver's actuation of the brake pedal 32 exceeds a predetermined limit, friction braking through hydraulic actuation of the wheel cylinders 36 is applied in combination with or in lieu of regenerative braking. It should be noted that the invention is not limited to a front drive configuration, and those of skill in the art will appreciate that features of the invention can be provided with a rear drive or all-wheel drive configurations, for example.

The secondary hydraulic braking circuit 26B includes an inlet line 80 (an output line from a secondary output of the master cylinder 28) in fluid communication with an outlet of a secondary chamber $C_2$ of the master cylinder 28 (FIG. 4). The inlet line 80 is fluidly separated from the inlet line 44, so that the primary and secondary circuits 26A, 26B can provide a separate braking effect to each respective set of wheel cylinders (which are separated for front/rear in the illustrated construction). The inlet line 80 is in communication with a separation valve 84 (e.g., a normally-open, electromagnetically controlled 2-position valve). The outlet of the separation valve 84 is coupled to both of the rear wheel cylinders 36 through respective inlet valves 58 (e.g., normally-open electromagnetically controlled 2-position valves) on parallel pressure lines 59. Each of the rear wheel cylinders 36 is also coupled to a suction side of a pump 60-2 via a respective outlet valve 62 (e.g., a normally-closed electromagnetically controlled multi-position valve) on parallel relief lines 63. The pump 60-2 can include one or a plurality of pump elements (e.g., three elements). The outlet valves 62 can be controlled between a variety of open positions by the controller 40 to bleed off pressure from the wheel cylinders 36 that is deemed excessive or likely to exceed the traction limit. The pump 60-2 is driven by the motor M (e.g., jointly driven with the pump 60-1 of the primary braking circuit 26A). The pressure side of the pump 60-2 is coupled to a reservoir R of the master cylinder 28 through a pressure control regulator valve 88 (e.g., a normally-closed electromagnetically controlled multi-position valve) on a return line 90.

Turning now to the master cylinder 28, which is shown in greater detail in FIG. 4, each of the chambers $C_1$, $C_2$ is a variable volume chamber as controlled by respective first and second pistons $P_1$, $P_2$. The brake pedal 32 actuates the first piston $P_1$ in conjunction with a booster device B, described below. The second piston $P_2$ is a floating piston, which is actuated only indirectly by movement of the first piston $P_1$. The brake pedal 32 is coupled to a rod 94 which serves as an input to the booster device B. The first piston $P_1$ is coupled to an output rod 95 of the booster device B for movement therewith. The booster device B is configured such that, under a threshold or "cut-in" force, a force on the brake pedal 32 is transferred to the first piston $P_1$, and above the threshold force, the force on the brake pedal 32 makes up a percentage of the force on the first piston $P_1$ while the booster device B provides the remainder. Thus, during normal operation, the brake pedal 32 does not directly actuate the first piston $P_1$ throughout the range of the brake pedal 32. Only during a fail-safe mode is the force from the brake pedal 32 transmitted directly to the first piston $P_1$ throughout the range of the brake pedal 32. To apply booster-assisted braking, the stroke is detected by the detector 74 and a corresponding controller output is sent to the booster device B to move the output rod 95 a corresponding amount. In some constructions, the booster device B can adjust the mixture of brake pedal-applied force and booster-applied force provided to the first piston $P_1$ in real time during a braking event, such that as the reaction force on the first piston $P_1$ changes, the mixture is adjusted to keep the pedal force constant. The booster device B can be an electromechanical booster, including a booster motor $M_B$, a transmission device 98, and a boost body 99 drivable by the booster motor $M_B$ through the transmission device 98. The boost body 99 is coupled to the output rod 95. In the illustrated construction, the transmission device 98 includes a drive screw coupled to the output of the booster motor $M_B$ and external threads formed on the boost body 99, but other arrangements are optional. A return spring 96 biases the boost body 99 away from the master cylinder 28.

If the amount of pedal stroke detected by the detector 74 is at or below an amount corresponding to an amount of braking that can be provided solely by regenerative braking from the hybrid drive element 70, the pistons $P_1$, $P_2$ will be moved, but pressure is not generated in the pressure lines 59 for actuating the wheel cylinders 36. Instead, the second piston $P_2$ is allowed to move by an amount substantially equal to that of the first piston $P_1$, so that the volume of the primary chamber $C_1$ does not decrease, and a corresponding pressure increase is avoided. The pressure control valve 88 in the secondary circuit 26B is opened to fluidly connect the second master cylinder chamber $C_2$ with the reservoir R, allowing the fluid displaced from the second chamber $C_2$ to simply return or "drain" to the reservoir R such that substantially no hydraulic braking at the rear wheel cylinders 36 takes place.

When the detector 74 detects a pedal stroke amount corresponding to an amount of braking that cannot be provided solely by regenerative braking from the hybrid drive element 70, the pistons $P_1$, $P_2$ will be moved, and pressure is generated in one or both sets of pressure lines 59 for actuating the wheel cylinders 36 either in combination with regenerative braking or in lieu of regenerative braking. In either circumstance, the secondary circuit 26B operates "by wire" (i.e., under electronic control) to build hydraulic pressure via the pump 60-2. With the pressure control valve 88 closed or partially closed, the pump 60-2 supplies pressure to the secondary master cylinder chamber $C_2$. This causes the floating piston $P_2$ to compress the primary chamber $C_1$ so that hydraulic pressure can be supplied to the input line 44 for the primary circuit 26A. The inlet valves 58 in the secondary circuit 26B can be closed if it is desired to only provide hydraulic braking at the front wheel cylinders 36, or can be opened if it is desired to also provide hydraulic braking at the rear wheel cylinders 36.

The determination by the controller 40 to generate hydraulic braking pressure can arise from a variety of circumstances or scenarios. For example, a braking demand may be inherently higher than the amount of deceleration available from regenerative braking, or the regenerative braking capability may decrease (i.e., at low speed) so that hydraulic braking must be blended with the regenerative braking as a supplement to meet a braking demand which may have initially been met by regenerative braking alone. Furthermore, certain vehicle situations may require a precision hydraulic braking intervention, for example, when the vehicle encounters a slick road surface during a braking event. During any scenario in which braking force is blended from regenerative to partially- or fully-hydraulic, the building of hydraulic pressure for the entire braking system falls on the secondary circuit 26B since this is the circuit responsible for "draining" hydraulic fluid (from the second master cylinder chamber $C_1$) to maximize regenerative braking potential and prevent hydraulic braking under normal circumstances. In order to avoid relying solely on the second pump 60-2, the invention provides a means for fluidly coupling the pump 60-1 of the primary circuit 26A with the secondary circuit 26B. This reduces the demand on the second pump 60-2 and enhances the pressure building capability of the system, which may be particularly useful in large vehicles.

In a first construction, a valving arrangement including four valves to control whether the primary pump 60-1 is fluidly separated from the secondary circuit 26B or fluidly coupled therewith. The valving arrangement includes two valves 110, 112 in fluid communication with an outlet side of the primary pump 60-1 and two valves 114, 116 in fluid communication with an inlet side of the primary pump 60-1. The first valve 110 is positioned between the outlet side of the pump 60-1 and the pressure line 59 downstream of the pilot valve 48, which is the normal or conventional connection to the outlet side of the pump 60-1. The second valve 112 is positioned between the outlet side of the pump 60-1 and a first connection line 120 coupled to the outlet side of the secondary pump 60-2 on the pressure line 59 of the secondary circuit 26B, downstream of the separation valve 84. Similarly, the inlet side of the primary pump 60-1 is coupled to the high pressure switching valve 52 and the low pressure accumulator 64 of the primary circuit 26A (typical connections) via the first valve 114, while the second valve 116 selectively couples the inlet side of the primary pump 60-1 with a second connection line 122 coupled to the inlet side of the secondary pump 60-2 and the return line 90. When coupled via the first and second connection lines 120, 122, the pumps 60-1, 60-2 are fluidly connected in parallel.

As illustrated, the valves 110, 112, 114, 116 can be biased to default states that keep the primary pump 60-1 coupled within the primary circuit 26A and separated from the secondary pump 60-2 (i.e., valves 110, 114 normally open, and valves 112, 116 normally closed). In such a construction, the valves 110, 112, 114, 116 are actuated by the controller 40 to switch states when a hydraulic pressure build is demanded for blending hydraulic braking with regenerative braking. In an alternate construction, the valves 112, 114, 116 can be biased to default states that couple the primary pump 60-1 with the secondary circuit 26B, in parallel with the secondary pump 60-2 (i.e., valves 110, 114 normally closed, and valves 112, 116 normally open). In such a construction, the actuation of the valves 110, 112, 114, 116 is not required for blending hydraulic braking with regenerative braking. Rather, actuation of the valves 110, 112, 114, 116 may be required for other active pressure builds such as traction control, vehicle dynamics control, adaptive cruise control, etc.

By combining the primary pump 60-1 with the secondary pump 60-2 in the secondary circuit 26B, several advantages can be realized. The pump speed, as controlled by the motor M and the controller 40, can be lowered for a given output. Noise, vibration, and harshness can be reduced with respect to both sound and the brake pedal 32. Pump life may be extended due to lower load. There is also an increase in available pressure build dynamics during blending hydraulic with regenerative braking. With the valves 110, 116 open (and with the valves 112, 114 closed), new fluid can be introduced into the primary circuit 26A, thereby shortening the effective pedal stroke or compensating for lost travel in the actuation. The newly introduced fluid can be drawn from the reservoir R, through the secondary circuit 26B (i.e., return line 90) and the second connection line 122. In the illustrated construction, the valves 114, 116 are energized and the valves 110, 112 are non-energized to introduce new fluid into the primary circuit 26A from the reservoir R, but the default states of the valves may vary from the illustrated construction as discussed above.

Figure 2:
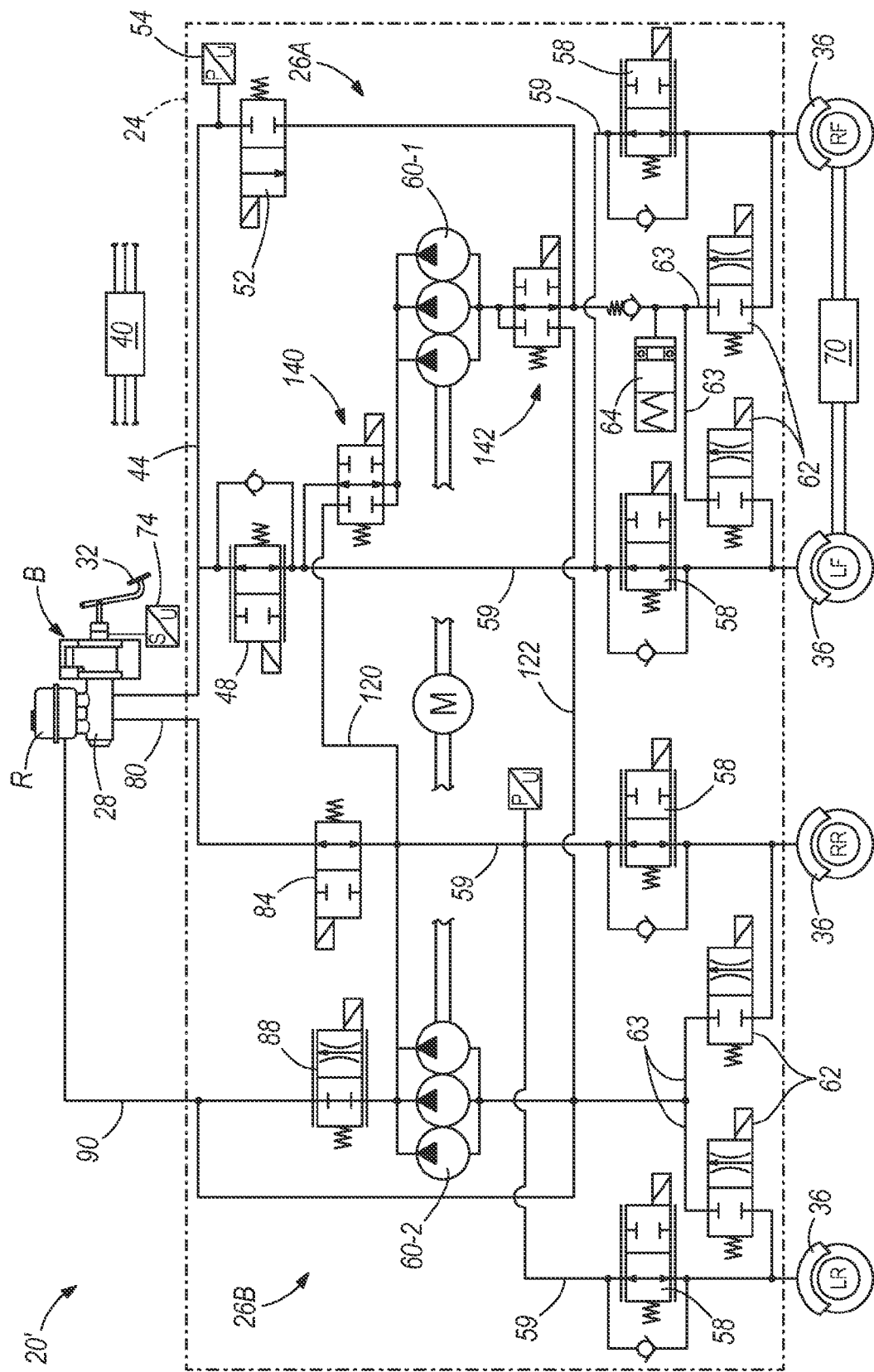
FIG. 2 is a schematic view of a hydraulic braking system according to another aspect of the invention.
Figure 3:
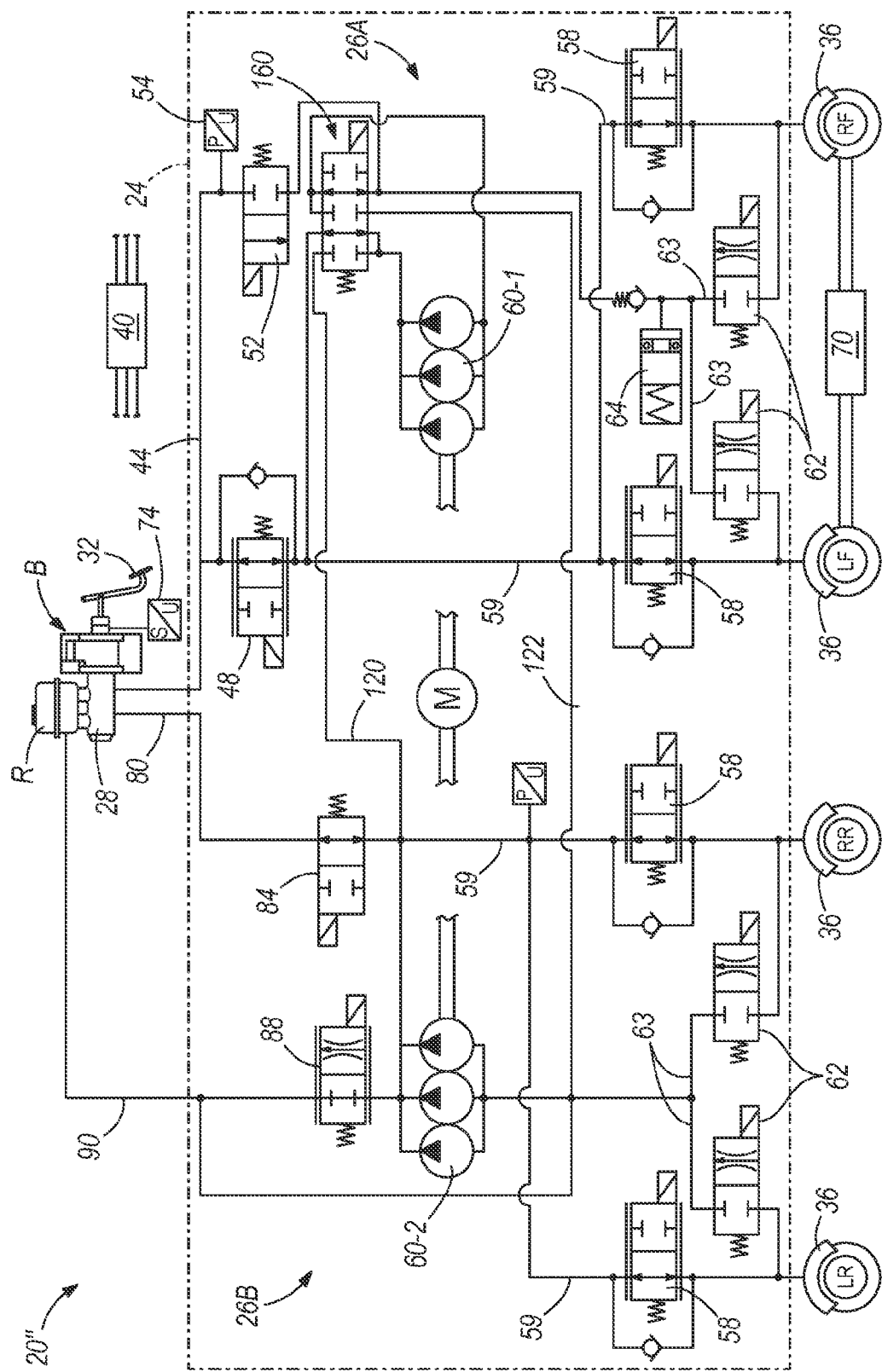
FIG. 3 is a schematic view of a hydraulic braking system according to yet another aspect of the invention.

As shown in FIGS. 2 and 3, alternate valving arrangements can be provided for selectively changing the pump 60-1 of the primary circuit 26A between being isolated from the secondary circuit 26B and being fluidly coupled with the secondary circuit 26B to cooperate with the secondary pump 60-2. In FIG. 2, the valving arrangement of an alternate braking system 20' includes two valves: a first valve 140 fluidly coupled to the outlet side of the primary pump 60-1 and a second valve 142 fluidly coupled to the inlet side of the primary pump 60-1. The first valve 140 has a first position that couples the outlet side of the pump 60-1 and the pressure line 59 downstream of the pilot valve 48, which is the normal or conventional connection to the outlet side of the pump 60-1. The first valve 140 has a second position that couples the outlet side of the pump 60-1 and the connection line 120 coupled to the outlet side of the secondary pump 60-2 on the pressure line 59 of the secondary circuit 26B, downstream of the separation valve 84. When one position of the valve 140 is selected, the fluid communication path established by the other position is closed off. The second valve 142 has a first position that couples the inlet side of the primary pump 60-1 to the high pressure switching valve 52 and the low pressure accumulator 64 of the primary circuit 26A (typical connections), and a second position that couples the inlet side of the primary pump 60-1 with the connection line 122 coupled to the inlet side of the secondary pump 60-2 and the return line 90. When one position of the valve 142 is selected, the fluid communication path established by the other position is closed off. Similar to that of FIG. 1, the valving arrangement of FIG. 2 enables new fluid to be introduced to the primary circuit 26A from the secondary circuit 26B (from reservoir R through return line 90 and second connection line 122). To introduce new fluid, the second valve 142 is energized to couple the inlet side of the primary pump 60-1 with the connection line 122, while the first valve 140 is left un-energized.

In FIG. 3, the valving arrangement of another alternate braking system 20" includes a single valve 160 for switching the connection between both the inlet side and the outlet side of the primary pump 60-1. The valve 160 has a first portion that couples the outlet side of the pump 60-1 to one of: A) the pressure line 59 downstream of the pilot valve 48, and B) the connection line 120 coupled to the outlet side of the secondary pump 60-2 on the pressure line 59 of the secondary circuit 26B, downstream of the separation valve 84. When one position is selected, the fluid communication path established by the other position is closed off. The valve 160 has a second portion that couples the inlet side of the primary pump 60-1 to one of: A) the high pressure switching valve 52 and the low pressure accumulator 64 of the primary circuit 26A (typical connections), and B) the connection line 122 coupled to the inlet side of the secondary pump 60-2 and the return line 90. When one position is selected, the fluid communication path established by the other position is closed off. The valve 160 can be configured with a single switching device or dual switching devices. In either case, the first and second portions are switched simultaneously to switch the primary pump 60-1 between being isolated from the secondary circuit 26B and being fluidly coupled with the secondary circuit 26B to cooperate with the secondary pump 60-2.

It should be noted that particular aspects of the braking systems disclosed herein are subject to variation for use in a variety of different vehicles. Those of skill in the art will appreciate that such variation is contemplated by this disclosure, without excessive illustration herein. For example, the invention need not be used in conjunction with a regenerative braking hybrid drive element. Likewise, the primary braking circuit need not be coupled with the drive wheels, and furthermore alternate drive configurations are optional (e.g., rear wheel drive, all-wheel drive). As already made clear above, the pump-switching valving arrangement may be constructed in a variety of ways, and the default states of these valves may be altered as desired.

Various features and advantages of the invention are set forth in the following claims.

What is claimed is:

1. A vehicle braking system comprising:
   a master cylinder having first and second outputs;
   a first hydraulic braking circuit provided between the first master cylinder output and a first hydraulic wheel cylinder;
   a second hydraulic braking circuit provided between the second master cylinder output and a second hydraulic wheel cylinder;
   a first pump provided in the first hydraulic braking circuit and operable to generate pressure and move hydraulic fluid within the first hydraulic braking circuit;
   a second pump provided in the second hydraulic braking circuit and operable to generate pressure and move hydraulic fluid within the second hydraulic braking circuit; and
   a valving arrangement operable to establish fluid communication between the first pump and the second hydraulic braking circuit in a first configuration and to prevent fluid communication between the first pump and the second hydraulic braking circuit in a second configuration, wherein the valving arrangement is further configured to close off fluid communication between the first pump and the first hydraulic braking circuit when in the first configuration, such that the first pump is operative directly in the second hydraulic braking circuit and is only operative in the first hydraulic braking circuit indirectly through the master cylinder.

2. The vehicle braking system of claim 1, wherein the valving arrangement defaults to the second configuration.

3. The vehicle braking system of claim 1, wherein the valving arrangement couples the first pump and the second pump in parallel in the first configuration.

4. The vehicle braking system of claim 1, wherein the valving arrangement defaults to the first configuration.

5. The vehicle braking system of claim 1, wherein the first hydraulic wheel cylinder is configured to brake a driven wheel, the braking system further comprising a hybrid drive element coupled to the driven wheel and operable to selectively act as a regenerative brake on the driven wheel.

6. The vehicle braking system of claim 1, wherein the valving arrangement includes a first pair of valves in fluid communication with an outlet side of the first pump and a second pair of valves in communication with an inlet side of the first pump, wherein a first valve of the first pair and a first valve of the second pair selectively fluidly couple the first pump within or fluidly cut off the first pump from the first hydraulic braking circuit, and wherein a second valve of the first pair and a second valve of the second pair selectively fluidly couple the first pump to or fluidly cut off the first pump from the second hydraulic braking circuit.

7. The vehicle braking system of claim 1, wherein the valving arrangement includes a first valve in fluid communication with an outlet side of the first pump and a second valve in fluid communication with an inlet side of the first pump, wherein each of the first and second valves has a first position fluidly coupling the first pump within the first hydraulic braking circuit while cutting off the first pump off from the second hydraulic braking circuit, and a second position fluidly coupling the first pump with the second hydraulic braking circuit while cutting off the first pump from the first hydraulic braking circuit.

8. The vehicle braking system of claim 1, wherein the valving arrangement includes a single valve, the valve has a first portion that couples an outlet side of the first pump to one of A) the first hydraulic braking circuit, and B) the second hydraulic braking circuit, and the valve has a second portion that couples an inlet side of the first pump to one of A) the first hydraulic braking circuit, and B) the second hydraulic braking circuit.

9. The vehicle braking system of claim 1, wherein the valving arrangement is operable to establish fluid communication between only an inlet side of the first pump and the second hydraulic braking circuit and not between an outlet side of the first pump and the second hydraulic braking circuit in a third configuration.

10. A vehicle braking system comprising:
    a brake pedal operable by a vehicle driver;
    a first hydraulic braking circuit including a hydraulic wheel cylinder configured to brake a driven wheel in response to actuation of the brake pedal;
    a second hydraulic braking circuit including a hydraulic wheel cylinder configured to brake a non-driven wheel in response to actuation of the brake pedal;
    a hybrid drive element coupled to the driven wheel and configured to selectively drive the driven wheel and configured to selectively act as a regenerative brake on the driven wheel in response to actuation of the brake pedal;
    a first pump provided in the first hydraulic braking circuit and operable to generate pressure and move hydraulic fluid within the first hydraulic braking circuit;
    a second pump provided in the second hydraulic braking circuit and operable to generate pressure and move hydraulic fluid within the second hydraulic braking circuit; and
    a valving arrangement operable in a first configuration to establish fluid communication between the first pump and the second hydraulic braking circuit and to close off fluid communication between the first pump and the first hydraulic braking circuit, such that the first pump is operative directly in the second hydraulic braking circuit and is only operative in the first hydraulic braking circuit indirectly through the master cylinder, the valving arrangement further being operable in a second configuration to prevent fluid communication between the first pump and the second hydraulic braking circuit, wherein both the first and second pumps are operable to pressurize hydraulic brake fluid within the second hydraulic braking circuit to increase an amount of hydraulic braking provided by at least one of the hydraulic wheel cylinders in conjunction with a reduction in regenerative braking when the valving arrangement is in the first configuration.

11. The vehicle braking system of claim 10, wherein the valving arrangement defaults to the second configuration.

12. The vehicle braking system of claim 10, wherein the valving arrangement couples the first pump and the second pump in parallel in the first configuration.

13. The vehicle braking system of claim 10, wherein the valving arrangement defaults to the first configuration.

14. The vehicle braking system of claim 10, wherein the valving arrangement includes a first pair of valves in fluid communication with an outlet side of the first pump and a second pair of valves in communication with an inlet side of the first pump, wherein a first valve of the first pair and a first valve of the second pair selectively fluidly couple the first pump within or fluidly cut off the first pump from the first hydraulic braking circuit, and wherein a second valve of the first pair and a second valve of the second pair selectively fluidly couple the first pump to or fluidly cut off the first pump from the second hydraulic braking circuit.

15. The vehicle braking system of claim 10, wherein the valving arrangement includes a first valve in fluid communication with an outlet side of the first pump and a second valve in fluid communication with an inlet side of the first pump, wherein each of the first and second valves has a first position fluidly coupling the first pump within the first hydraulic braking circuit while cutting off the first pump off from the second hydraulic braking circuit, and a second position fluidly coupling the first pump with the second hydraulic braking circuit while cutting off the first pump from the first hydraulic braking circuit.

16. The vehicle braking system of claim 10, wherein the valving arrangement includes a single valve, the valve has a first portion that couples the outlet side of the first pump to one of A) the first hydraulic braking circuit, and B) the second hydraulic braking circuit, and the valve has a second portion that couples the inlet side of the first pump to one of A) the first hydraulic braking circuit, and B) the second hydraulic braking circuit.

17. The vehicle braking system of claim 10, wherein the valving arrangement is operable to establish fluid communication between only an inlet side of the first pump and the second hydraulic braking circuit and not between an outlet side of the first pump and the second hydraulic braking circuit in a third configuration.

18. A method of operating a vehicle braking system, the method comprising:
selectively switching a first pump from a first configuration providing only fluid communication with a first hydraulic braking circuit to a second configuration providing only fluid communication with a second hydraulic braking circuit; and
with the first pump in the second configuration, operating the first pump along with a second pump of the second hydraulic braking circuit to pressurize hydraulic fluid within the second hydraulic braking circuit directly and to pressurize hydraulic fluid within the first hydraulic braking circuit indirectly through the master cylinder.

19. The method of claim 18, further comprising providing the pressurized hydraulic fluid to a secondary master cylinder chamber with a floating piston, thereby compressing a primary chamber of the master cylinder to effect a hydraulic braking increase in the first hydraulic braking circuit, wherein the hydraulic braking increase in the first hydraulic braking circuit is timed to coincide with a reduction in regenerative braking to at least one drive wheel associated with the first hydraulic braking circuit.

* * * * *